United States Patent [19]

Edwards

[11] 4,428,990

[45] Jan. 31, 1984

[54] TRAFFIC ACCESSORY

[75] Inventor: Christopher H. Edwards, Pretoria, South Africa

[73] Assignee: Trafftrans (Proprietary) Limited, Pretoria, South Africa

[21] Appl. No.: 377,096

[22] Filed: May 11, 1982

[30] Foreign Application Priority Data

May 14, 1981 [ZA] South Africa .................. 81/3224

[51] Int. Cl.³ ............................................. B32B 7/06
[52] U.S. Cl. ................................. 428/41; 428/294; 428/295; 428/354; 428/343; 428/900
[58] Field of Search ............... 156/47, 51, 52; 428/40, 428/41, 294, 295, 343, 354, 906, 900; 404/14

[56] References Cited

U.S. PATENT DOCUMENTS

| | | | |
|---|---|---|---|
| 2,292,024 | 8/1942 | Dreher | 428/352 X |
| 3,270,122 | 8/1966 | Binek | 156/52 X |
| 3,853,576 | 12/1974 | Netznik | 156/344 X |

FOREIGN PATENT DOCUMENTS 2015875 10/1971 Fed. Rep. of Germany .
2151188 4/1973 France .

Primary Examiner—Alexander Thomas
Attorney, Agent, or Firm—Karl W. Flocks; A. Fred Starobin; Sheridan Neimark

[57] ABSTRACT

According to the invention, the traffic accessory for temporary attachment to a road surface comprises an adhesive surface which is adhesively attachable to a road surface, the adhesive surface being provided with a plurality of release sheets.

3 Claims, 3 Drawing Figures

TRAFFIC ACCESSORY

This invention relates to a traffic accessory for temporary attachment to a road surface.

According to the invention, the traffic accessory for temporary attachment to a road surface comprises, broadly, an adhesive surface which is adhesively attachable to a road surface, the adhesive surface being provided with a removable release sheet.

More particularly, the accessory comprises a plurality of adhesive zones which are adhesively attachable to the road surface, at least some of which zones are provided with individually removable release sheets, whereby they are rendered non-adhesive.

All the adhesive zones may be provided with said release sheets, the adhesive zones being continguous to form a single adhesive surface for the accessory, the release sheets being contiguous but separate or separable from one another. The release sheets may be divided into a plurality of groups by being marked distinguishably; and the sheets of each group may be substantially evenly distributed amongst the sheets of the other group or groups, the groups each having substantially the same number of sheets.

The accessory may be flattened to permit vehicles to drive over it, having a pair of major surfaces, one of which is provided with the adhesive zones, and which in use is the lower surface of the accessory.

The accessory may be a road sign, such as an arrow, stop sign, yield sign, or the like warning or traffic control sign.

Instead, the accessory may be a traffic control device, such as a switch operable by a vehicle driving over it, for example to control a set of traffic lights, such as at a temporary installation, for example at a road deviation, road repair site, or the like.

Instead, the accessory may be a traffic monitoring device, for example of the type used for counting traffic, eg for counting the number of vehicles passing over the device.

The device may thus be in the form of a strip having an electrical lead extending lengthwise along it, and the strip may be in the form of a loop along which the lead extends in the form of one or more coils.

In particular, the device may comprise an inductive loop for counting traffic which, when placed on a road surface and attached to a suitable counter, acts to sense, and thereby count, vehicles passing along the road and over it, by exhibiting changes in its inductance, which are counted by the counter in response to the vehicles passing over it.

In one embodiment of the invention, the accessory may comprise a surface inductive device for counting traffic, which comprises an adhesive tape along which an electrical lead extends, the lead being attached to the tape and the tape having an adhesive surface to which a release sheet is attached. In a simple form of this embodiment, the device may form a surface inductive loop wherein a single electric lead may pass in one or more coils around the loop, or several separate leads used together may pass around the loop, the lead or leads being sandwiched between the adhesive tape and the release sheet. To use this loop, the release sheet is removed and the tape is simply pressed down, adhesive side down, on the road surface. The lead or leads are then led off the road and attached to a suitable counter. The release sheet can be removed at a location alongside the road, and the user need only be on the road surface for as long as it takes to stick the tape firmly down, thus leading to enhanced safety in heavy traffic, while avoiding the need to use a road block during installation. This embodiment, however, cannot in general be re-used, as the adhesive surface becomes soiled with dust, grit or the like, and thus thereafter has insufficient adhesiveness to be used again.

To permit re-use, the release sheet may be divided into a longitudinally extending series of separate or easily separable (eg by lines of weakness) individually removable release sheets, which may be marked distinguishably from each other. Thus, the sheets may be divided into a plurality of groups, marked accordingly, such as group A, group B and group C, or by colours or numbers instead of letters, the location, size and number of sheets in each group on the loop being selected so that when only the sheets of a particular group are removed, sufficient adhesion is provided to attach the loop securely to a road surface in traffic conditions.

The loop is then re-usable as many times as there are groups of sheets, one group being removed the first time the loop is used, another group the next time, and so forth, until all the groups have been removed. This means that each time the loop is stuck down, fresh zones of adhesive are available for the sticking. Those zones which have been used before and are soiled with dust, etc., can provide some help to the zones used later, but need not be relied upon.

Suitable tapes with pre-applied release sheets are commercially available, having non-adhesive backing material, a release sheet, and adhesive therebetween. As inserting the lead or leads between the adhesive and the release sheet can be time-consuming, commercially available tapes can be used by employing them in a double layer for making an inductive loop. In this construction, the loop is made by removing the backing sheet from one or more strips of tape, forming the tape into a loop of desired profile, sticking the lead or leads to the adhesive of the tape, and then sticking the loop to the backing material of a further loop having substantially the same outline, to form said double layer, with the lead or leads between the two layers, the layer whose backing material has the other layer stuck to it, retaining its release sheet, divided optionally into groups of sheets as described above, for removal prior to sticking down on a road surface. In other words, the strip of tape may comprise two adhesvie tapes each comprising an adhesive surface and backing material on which the adhesive surface is provided, the lead being sandwiched between the tapes with the adhesive surface of the one tape adhering to the backing material of the other tape whose adhesive surface in turn carries the release sheet.

Tapes used in accordance with the invention, will be selected so that the adhesive and backing material are of sufficient strength, toughness and durability for use in traffic. These tapes may have woven backing material, eg glassfibre, nylon or a material of similar strength. A suitable tape is Grade 5300 BITUTHENE tape available in South Africa from W R Grace & Co. (South Africa) (Proprietary) Limited. This tape has a backing material and a bitumen-based adhesive surface of sufficient strength and is available commercially in rolls which can be cut to form tapes of a suitable width, eg 50 mm.

To facilitate removal of release sheets, each release sheet may be provided with reinforcing material in the form of an adhesive patch stuck thereto, each adhesive patch comprising adhesive stuck to the release sheet and backing material on the side of the adhesive remote from the release sheet, the adhesion between the patch and the release sheet being stronger than that between the release sheet and its associated zone, so that withdrawal of the patch from the strip causes withdrawal of the associated release sheet to expose the zone thereunder. When using a BITUTHENE tape for this purpose, it can be cut into suitable patches, the patches being stuck to the release sheets on a loop as described above. The release sheets have a treated surface which adheres to the adhesive on the loop and is easily removable therefrom, the opposite surface of each release sheet being untreated so that when the BITUTHENE patches are attached thereto, they are attached with substantially greater adhesion. Removal of the patches thus causes removal of the underlying release sheets from the loop.

When used for a road sign, the desired shape may be cut from eg BITUTHENE and the outer surface of the backing material may be coated with a suitable marking material (which may be reflective) such as STAMARK, or SCOTCHLANE (obtainable from 3M South Africa (Proprietary) Limited).

The invention will now be described, by way of example, with reference to the accompanying diagrammatic drawings, in which.

Figure 1:
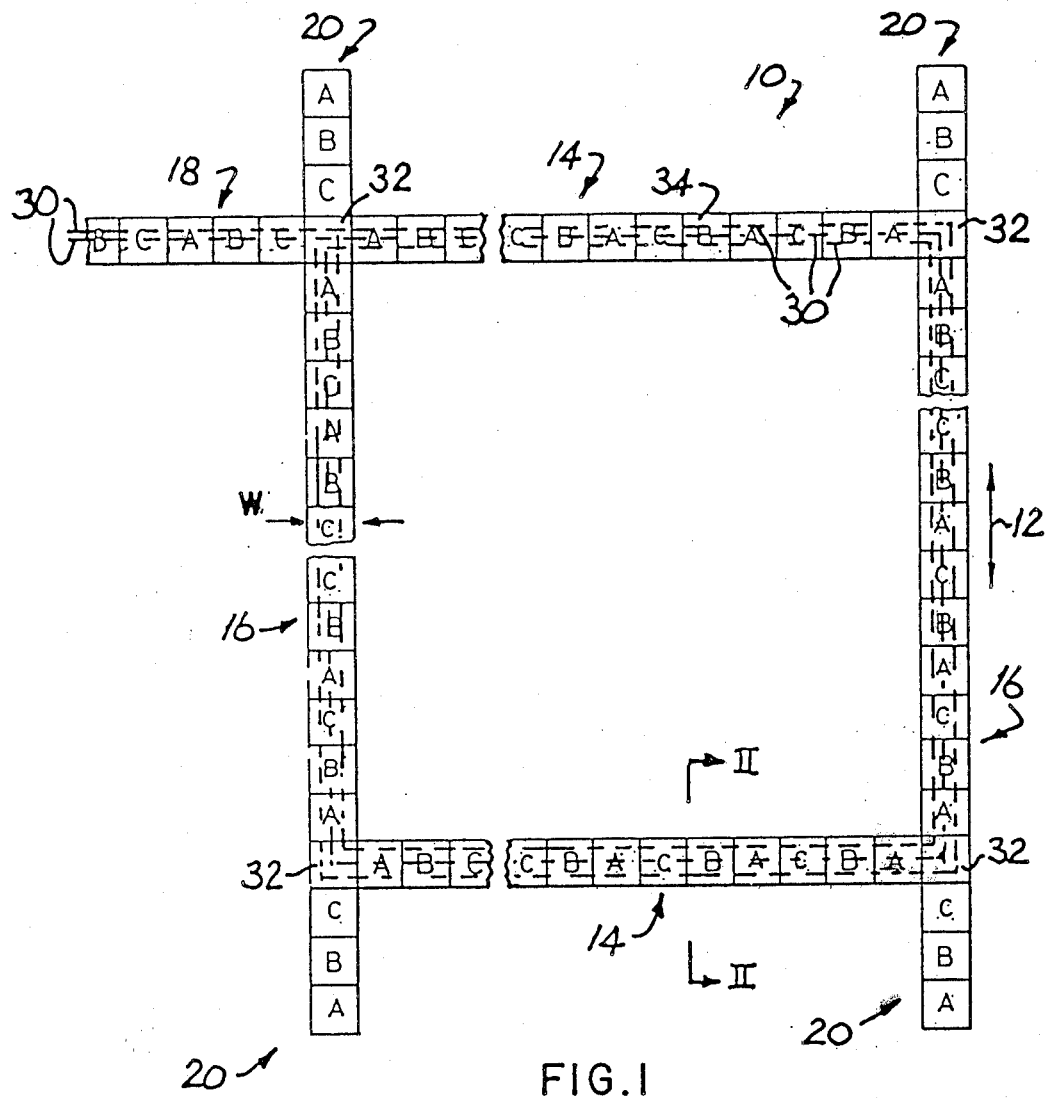
FIG. 1 shows an underside plan view of a traffic accessory in the form of an inductive loop for traffic counting according to the invention.

In FIG. 1, the inductive loop is generally designated by reference numeral 10. It is rectangular in outline (but can be square, trapezoidal, triangular, or parallelogram-shaped) and is intended for use in traffic flow in the direction of arrow 12. The rectangle of the loop 10 has two long sides 14 intended in use to be normal to traffic flow 12 and two short sides 16, perpendicular to the sides 14. One of the sides 14 has an extension at 18 for connection to a counter (not shown). The sides 16 in turn have, at opposite ends thereof, short extensions 20 projecting outwardly past the sides 14, to act as pull tags, as described hereunder.

Figure 2:
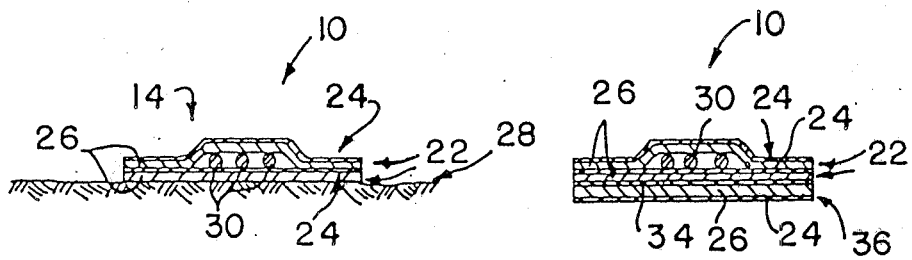
FIG. 2 shows a sectional end elevation of the tape of the loop of FIG. 1, at line II—II, with its release sheet removed and stuck onto a road surface.

In FIG. 2, the same reference numerals are used as in FIG. 1, unless otherwise specirfied. The side 14 shown in FIG. 2 is arranged in a double layer, made up of two layers 22 of tape, each comprising non-adhesive woven backing material 24, and ahesive 26. Suitable tape is BITUTHENE cut from a roll to have a 50 mm width 'W'.

The layers 22 are stuck to each other, the lower layer 22 being shown stuck to a road surface 28 via its adhesive 26, and the upper layer 22 being stuck via its adhesive 26 on the backing material 24 of the lower layer 22. An electric lead 30, passing three times around the loop 10 in three coils, is shown sandwiched between the layers 22 at a central position. The lead 30 enters the loop 10 via the extension 18 and exits from the loop 10 via the extension 18 where its ends are shown exposed in FIG. 1 for connection to a counter.

Each side 16 with its extensions 20 is a length of double-layer tape as are the sides 14, one of which is integral with the extension 18. To make the loop, the lower layers 22 of the sides 14, 16 are laid out in the outline of the loop 10, and are stuck together where the sides intersect each other at 32. The BITUTHENE tape has a release strip and the side 14, 16 which passes over the side 14, 16 at each intersection 32 has its release strip removed at said intersection to stick said sides together. Otherwise the release strip (which is heavy strong paper) is retained.

The upper layers 22 of the sides 14, 16, with their extensions 18, 20 are then arranged into the profile of the loop 10, this time with all the release strip removed. The lead 30 is coiled into its three coils and is stuck to the adhesive of the upper layer 22 of the loop 10, which is then stuck to the backing material 24 of the lower layer 22 of the loop 10.

In FIG. 1 the release strip of the lower layer 22 is visible, and is designated 34, being shown divided into a plurality of groups of sheets, marked respectively 'A', 'B' and 'C'. The loop 10 being intended for use on three separate occasions. The sheets 'A', 'B' and 'C' are about 50×50 mm, the release strip being slit transversely at 50 mm intervals along its length to define said sheets and to separate them from each other.

In use, for counting traffic on a road, a suitable counter will be placed alongside the road, and the loop 10 will be prepared for use by removing all the sheets of one of the groups 'A', 'B' or 'C' of the release strip 34. This preparation takes place alongside the road. The loop 10 is then carried on to the road and stuck down in the desired position and orientation with the sides 16 parallel to arrow 12. The extension 18 leads off the road surface to the counter to which the ends of the lead 30 are connected.

To remove the loop from the road, the tags formed by the extensions 20 of the sides 16 are gripped by hand and pulled, thereby to pull the loop 10 up off the road.

The next time the loop is used, all the sheets of a further one of the groups 'A', 'B' and 'C' are removed in a similar fashion, until all the zones have been removed.

Each release sheet in a group covers a zone of the adhesive surface of the tape. Thus, the first time the loop is used, the zones of tape covered by the release sheets of group A are used, the next time the zones of the adhesive surface covered by the release sheets of group B are used, and finally, the zones of the adhesive surface of the tape covered by the release sheets of group C are used.

Figure 3:
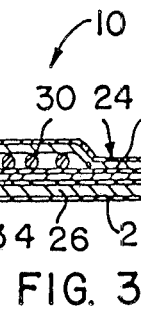
FIG. 3 shows a view corresponding to FIG. 2 of a further loop according to the invention, before it is stuck down.

FIG. 3 shows a development of the loop of FIGS. 1 and 2, and unless otherwise specified, the same reference numerals are used for the same parts in FIG. 3 as in FIGS. 1 and 2.

It has been found that the release sheet 34 of the BITUTHENE tape in question can become damaged in use, and inhibit the re-use of the loop. To guard against this, patches of BITUTHENE tape are made by cutting a suitable length of tape, and removing its release sheet, each patch corresponding in size to one of the release sheets 'A', 'B' and 'C' on the loop. The patches are stuck to the release sheets so that all said sheets of the groups are covered by patches.

In FIG. 3, the patch is generally designated 36, and likewise comprises backing material 24 and adhesive 26. The release sheet of the loop is designated 34. The release sheet 34, which is that of the lowermost layer 22 shown in FIG. 2, has a specially treated upper side facilitating its release from the adhesive 26 of the lowermost layer 22 in FIG. 2. Its outer surface, the lower surface in FIG. 3, is however untreated, so that a pull on the patch 36, via its adhesive 26, easily and reliably strips the release sheet 34 from the adhesive 36 of the lower layer 22. Furthermore, the backing material 24 of the patch 36, and the patch as a whole, protects the release sheet 34 of the loop.

The loop 10 of the present invention has a number of advantages compared with prior art loops which are formed by sticking one or more electrical leads on to a road surface with glue, followed by a protective strip which is then stuck over the lead. In particular the prior art leads are time-consuming to install, involving possible traffic disruption, and they are difficult if not impossible to remove from the road surface and are not reusable.

The present invention on the other hand is easy and quick to install as described above, and is firmly pressed down after installation by vehicle movement over it, giving enhanced adhesion and resisting pulling up by vehicles. As the BITUTHENE uses a bitumen-based adhesive, it is weatherproof, and resists dissolving by rainwater in use. Removal is quick and easy by pulling or cutting if necessary, between the adhesive and road surface. Removal is facilitated because, when one of the tags is pulled, the pulling force is conentrated on one or two of the adhering zones at a time.

It is contemplated that up to four or five or more groups of zones can be provided, enabling the loop to be used more than the three times proposed for the example shown in the drawings, depending on the nature and volume of the traffic. It will further be appreciated that instead of having all the zones of the same size, it is possible within limits to vary the size of the zones and their spacing. Thus, while in general the zones of a group will be separated by zones of the other groups as shown, and while certain zones as shown in FIG. 2 can be left blank in that they form part of none of the groups and are never exposed, it is possible for example to divide the tags 20 and areas of intersection 32 into smaller more closely spaced zones than the sides 14, 16, so as to facilitate initial pulling during removal of the loop 10 from the road surface.

While the invention has been described with particular reference to an inductive loop for traffic counting, it will be appreciated that its advantages of rapid installation with attendant safety and re-usability within limits while being essentially temporary and/or eventually disposable, apply also to other traffic accessories, as mentioned above, such as traffic control devices, road signs and the like.

I claim:

1. A traffic accessory in the form of an inductive loop for a traffic control or traffic monitoring device and temporarily and repeatedly attachable to a road surface, which comprises a loop in the form of a flattened strip to permit vehicles to drive over it and which has a pair of major surfaces, one of which is provided with a plurality of adhesive zones for use as the lower surface of the accessory for attachment to the road surface, the strip having an electrical lead extending lengthwise along it in the form of one or more coils, at least some of the zones being provided with individually removable release sheets, whereby they are rendered nonadhesive, the release sheets being divided into a plurality of groups by being marked distinguishably and the sheets of each group being substantially evenly distributed amongst the sheets of the other group or groups, the groups each having substantially the same number of sheets 2. A traffic accessory in the form of an inductive loop for a traffic control or traffic monitoring device and temporarily and repeatedly attachable to a road surface, which comprises a loop in the form of a flattened strip to permit vehicles to drive over it and which has a pair of major surfaces, one of which is provided with a plurality of adhesive zones for use as the lower surface of the accessory for attachment to the road surface, the strip having an electrical lead extending lengthwise along it in the form of one or more coils, at least some of the zones being provided with individually removable release sheets, whereby they are rendered nonadhesive, the release sheets being divided into a plurality of groups by being marked distinguishably and the sheets of each group being substantially envenly distributed amongst the sheets of the other group or groups, the groups each having substantially the same number of sheets, the strip comprising two adhesive tapes each comprising an adhesive surface and backing material on which the adhesive surface is provided, the lead being sandwiched between the tapes with the adhesive surface on the one tape adhering to the backing material of the other tape, whose adhesive surface in turn carries the release sheets.

3. A traffic accessory in the form of an inductive loop for a traffic control or traffic monitoring device and temporarily and repeatedly attachable to a road surface, which comprises a loop in the form of a flattened strip to permit vehicles to drive over it and which has a pair of major surfaces, one of which is provided with a plurality of adhesive zones for use as the lower surface of the accessory for attachment to the road surface, the strip having an electrical lead extending lengthwise along it in the form of one or more coils, at least some of the zones being provided with individually removable release sheets, whereby they are rendered nonadhesive, the release sheets being divided into a plurality of groups by being marked distinguishably and the sheets of each group being substantially evenly distributed amongst the sheets of the other group or groups, the groups each having substantially the same number of sheets, the strip comprising two adhesive tapes each comprising an adhesive surface and backing material on which the adhesive surface is provided, the lead being sandwiched between the tapes with the adhesive surface on the one tape adhering to the backing material of the other tape, whose adhesive surface in turn carries the release sheets, each release sheet being provided with reinforcing material in the form of an adhesive patch stuck thereto, each adhesive patch comprising adhesive stuck to the release sheet and backing material on the side of the adhesive remote from the release sheet, the adhesion between the patch and the release sheet being stronger than that between the release sheet and its associated zone, so that withdrawal of the patch from the strip causes withdrawal of the associated release sheet to expose the zone thereunder.

* * * * *